(12) United States Patent
Kobayashi et al.

(10) Patent No.: US 9,827,943 B2
(45) Date of Patent: *Nov. 28, 2017

(54) RUPTURABLE PLATE AND INFLATOR USING SAME

(71) Applicant: DAICEL CORPORATION, Osaka-shi, Osaka (JP)

(72) Inventors: Tomoharu Kobayashi, Tatsuro (JP); Masayuki Yamazaki, Tatsuro (JP)

(73) Assignee: DAICEL CORPORATION, Osaka-Shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/023,478

(22) PCT Filed: Oct. 1, 2014

(86) PCT No.: PCT/JP2014/076250
§ 371 (c)(1),
(2) Date: Mar. 21, 2016

(87) PCT Pub. No.: WO2015/060081
PCT Pub. Date: Apr. 30, 2015

(65) Prior Publication Data
US 2016/0207493 A1    Jul. 21, 2016

(30) Foreign Application Priority Data

Oct. 22, 2013    (JP) .................... 2013-219001

(51) Int. Cl.
*B60R 21/272*    (2006.01)
*B60R 21/274*    (2011.01)

(52) U.S. Cl.
CPC .......... *B60R 21/274* (2013.01); *B60R 21/272* (2013.01)

(58) Field of Classification Search
CPC ..... B60R 21/272; B60R 21/274; F16K 17/16; F16K 17/1606; F16K 17/1613;
(Continued)

(56) References Cited

U.S. PATENT DOCUMENTS 3,484,817 A * 12/1969 Wood ............... F16K 17/16
220/89.2
3,709,239 A * 1/1973 Morck, Jr. ......... F16K 17/162
137/68.25

(Continued)

FOREIGN PATENT DOCUMENTS

GB    2141177 A * 12/1984 ........ F16K 17/1626
JP    11-189122 A    7/1999
(Continued)

*Primary Examiner* — Laura Freedman
(74) *Attorney, Agent, or Firm* — Birch, Stewart, Kolasch & Birch, LLP

(57) ABSTRACT

An inflator includes a rupturable plate in a circular shape for closing an opening of a pressurized gas-filled space. The rupturable plate has a fragile portion formed by grooves in a regular polygon on one surface, including first fragile portions formed by grooves forming a circumference of the regular polygon, and second fragile portions formed by grooves extending from all apexes of the regular polygon to a center thereof creating a plurality of triangles formed by the first fragile portions as a base and the second fragile portions as the remaining two sides. The depth (h1) of the first fragile portion is less than the depth (h2) of the second fragile portion whereby, when pressure is exerted on a rear surface opposite to the fragile portions, the second fragile portions will rupture as the first fragile portions bend.

9 Claims, 3 Drawing Sheets (a)        (b)

(58) Field of Classification Search
CPC ............... F16K 17/162; F16K 17/1626; Y10T 137/1714; Y10T 137/1729; Y10T 137/1737; Y10T 137/1744
See application file for complete search history.

(56) References Cited

U.S. PATENT DOCUMENTS

| | | | | |
|---|---|---|---|---|
| 4,498,368 A * | 2/1985 | Doane | ............... | F41F 3/077 220/89.2 |
| 5,226,561 A * | 7/1993 | Hamilton | ............... | B60R 21/272 102/501 |
| 5,351,989 A * | 10/1994 | Popek | ............... | B60R 21/272 222/5 |
| 5,462,307 A * | 10/1995 | Webber | ............... | B60R 21/272 222/5 |
| 5,468,015 A * | 11/1995 | Goetz | ............... | B60R 21/272 280/737 |
| 5,564,740 A * | 10/1996 | Zakula | ............... | B60R 21/272 222/5 |
| 5,720,380 A * | 2/1998 | Graham, II | ............... | F16K 17/1613 220/89.3 |
| 5,803,492 A * | 9/1998 | Rink | ............... | B60R 21/272 222/3 |
| 5,897,136 A * | 4/1999 | Okada | ............... | B60R 21/264 280/737 |
| 6,116,642 A * | 9/2000 | Shirk | ............... | B60R 21/264 280/736 |
| 6,286,702 B1 * | 9/2001 | Buermann | ............... | B65D 83/70 215/253 |
| 6,357,792 B1 * | 3/2002 | Shirk | ............... | B60R 21/272 137/68.13 |
| 6,382,668 B1 | 5/2002 | Goetz | | |
| 6,786,507 B2 * | 9/2004 | Dolling | ............... | B60R 21/272 137/68.19 |
| 6,874,814 B2 * | 4/2005 | Hosey | ............... | B60R 21/272 280/737 |
| 6,908,105 B2 * | 6/2005 | Yamazaki | ............... | B60R 21/272 280/737 |
| 7,134,689 B2 * | 11/2006 | Matsuda | ............... | B60R 21/261 280/736 |
| 7,607,688 B2 * | 10/2009 | Kato | ............... | F42B 3/04 137/68.27 |
| 8,136,452 B2 * | 3/2012 | Asanuma | ............... | B60R 21/272 102/530 |
| 8,651,520 B2 * | 2/2014 | Jung | ............... | B60R 21/272 280/737 |
| 2002/0007755 A1 | 1/2002 | Perotto et al. | | |
| 2007/0052224 A1 * | 3/2007 | Nakayasu | ............... | B60R 21/268 280/740 |
| 2008/0136153 A1 | 6/2008 | Yamashita et al. | | |
| 2010/0127486 A1 | 5/2010 | Asanuma | | |
| 2017/0015273 A1 * | 1/2017 | Kobayashi | ............... | B60R 21/268 |

FOREIGN PATENT DOCUMENTS

| | | |
|---|---|---|
| JP | 2000-168487 A | 6/2000 |
| JP | 2001-354095 A | 12/2001 |
| JP | 2002-67869 A | 3/2002 |
| JP | 2008-137475 A | 6/2008 |
| JP | 2009-292238 A | 12/2009 |
| JP | 2010-125892 A | 6/2010 |

* cited by examiner

RUPTURABLE PLATE AND INFLATOR USING SAME

FIELD OF INVENTION

The present invention relates to a rupturable plate for closing an opening of a pressurized gas-filled space of an inflator using a pressurized gas, and to an inflator which uses the rupturable plate and is used in an airbag apparatus.

DESCRIPTION OF RELATED ART

In an inflator using a pressurized gas, the pressurized gas is stored inside a bottle closed at an opening with a rupturable plate. At the time of actuation, the rupturable plate is fractured and the pressurized gas is discharged to the outside of the bottle.

When such an inflator is incorporated in a restraining device using an airbag, such a structure is required that fragments produced by fracture of the rupturable plate does not discharge outside, so that an airbag is not damaged by the fragments. For this purpose, a filter is disposed to catch the fragments, or a fragile portion is provided in advance in the rupturable plate to ensure that the rupturable plate is fractured without producing any fragments.

Further, in order to ensure a discharge path for the gas after rupturing the rupturable plate, it is desirable that the ruptured portion be maintained in a sufficiently open state.

JP-A No. 2009-292238 discloses a rupturable plate in which scores are formed on both surfaces, and an inflator using the rupturable plate.

SUMMARY OF INVENTION

The present invention provides a rupturable plate in a circular shape for closing an opening of a pressurized gas-filled space in an inflator, including:

a fragile portion formed in a regular polygon on one surface of the rupturable plate, the fragile portion including,
  first fragile portions formed by grooves forming a circumference of the regular polygon, and
    second fragile portions formed by grooves extending from all apexes of the regular polygon to a center of the regular polygon;
a plurality of triangles formed by the first fragile portions as a base and the second fragile portions as the remaining two sides,
a depth (h1) of first fragile portion and a depth (h2) of second fragile portion satisfying the relationship h1<h2, and
at the time of rupture, the rupturable plate receiving a pressure on a rear surface opposite to the one surface provided with the fragile portion, and rupturing to a side of the one surface provided with the fragile portion.

The present invention further provides an inflator charged with a pressurized gas as a gas source, including:

a gas outlet of the pressurized gas-filled space being closed with the rupturable plate according to claim 1 or 2, the rupturable plate being attached such that the one surface provided with the fragile portion faces a side of the pressurized gas-filled space; and a device for fracturing the rupturable plate.

The present invention further provides use of a rupturable plate for closing an opening of a pressurized gas-filled space in an inflator.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF INVENTION

Figure 1:
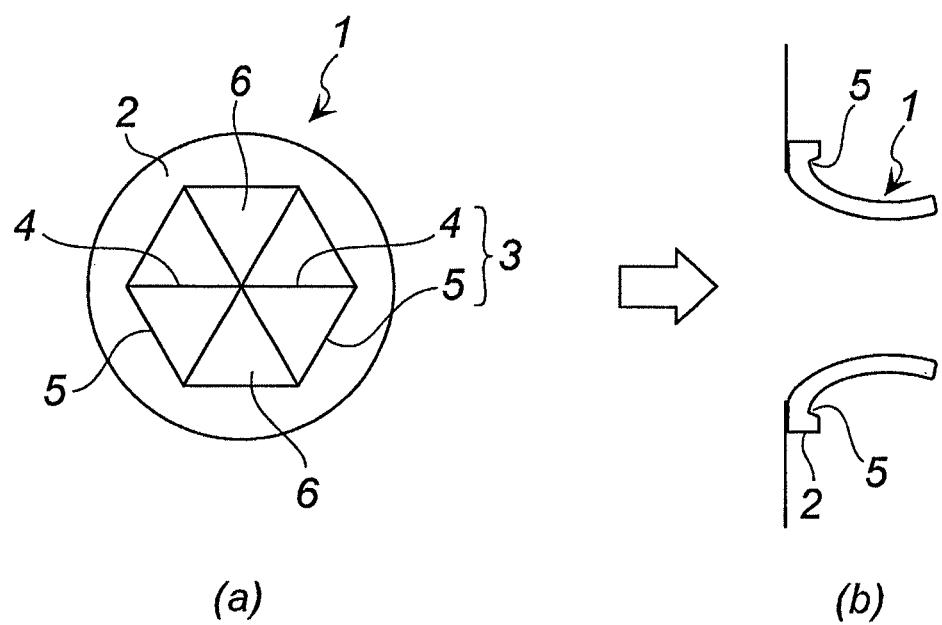
FIG. 1 shows, in (a), a plan view of the rupturable plate of the present invention which is taken from the fragile portion side, and, in (b), a side view for explaining the rupturing direction when the rupturable plate depicted in (a) is ruptured.

When a rupturable plate having scores, such as disclosed in JP-A No. 2009-292238, is used, the rupturable plate is fractured into large triangular fragments at the time of actuation. The fragments are caught in the middle of gas discharging process and are thus prevented from exiting the inflator and flowing into the airbag (paragraph [0050]).

The present invention provides a rupturable plate for an inflator that opens a closed portion of the pressurized gas-filled space without producing the fragments, and also provides an inflator using the rupturable plate.

The rupturable plate in accordance with the present invention is used for closing the opening of the pressurized gas-filled space in an inflator using a pressurized gas as a gas source.

The thickness of the rupturable plate in accordance with the present invention is preferably 0.20 mm to 2.0 mm, more preferably 0.20 mm to 1.0 mm, even more preferably 0.20 mm to 0.50 mm.

The rupturable plate in accordance with the present invention has a fragile portion including first fragile portions and second fragile portions only on one surface.

The fragile portion is formed in a regular polygon. In mathematics, a regular polygon is "a polygon in which all sides have the same length and all angles are equal in measure", but the lengths of the sides and the angles may differ by several percent, provided that normal rupture of the rupturable plate is not affected, and there may be a certain difference between the angles or dimensions as long as the advantageous effect of the present invention is obtained.

The first fragile portions and the second fragile portions are formed by grooves, and the thickness of the rupturable plate is reduced by the depth of the grooves in the portions where the first fragile portions and the second fragile portions are formed.

The depth (h1) of first fragile portion and the depth (h2) of second fragile portion satisfy the relationship h1<h2. Therefore, when the same load is applied, the second fragile portions are more likely to rupture.

The width of the groove is not particularly limited and may be about the same as the depth.

When the rupturable plate of the present invention receives a pressure on the rear surface of the surface provided with the fragile portion (the first fragile portions and the second fragile portions), the first fragile portions are bent and the second fragile portions rupture and open like petals as a whole.

When the fragile portion has an overall triangular, a square, or a hexagonal shape, the fragile portion fractures as three, four, or six petals, respectively.

The grooves forming the first fragile portions and the second fragile portions may be formed continuously or discontinuously (for example, as dot lines). The second fragile portions may be continuous grooves and the first fragile portions may be discontinuous grooves.

The lateral cross-sectional shape of the grooves forming the first fragile portions and the second fragile portions can be V-shaped, U-shaped, semicircular, or trapezoidal. The first fragile portions and the second fragile portions may have different cross-sectional shapes, such that the first fragile portions are V-shaped and the second fragile portions are rectangular.

The depth and width of the grooves forming the first fragile portions and the second fragile portions may be adjusted to enable the above-described petal-like opening while maintaining the strength necessary for the rupturable plate. Further, after the rupturable plate opens towards the pressurized gas-filled space, the portion which opens like petals may be bent by the gas flow to the opposite side.

The preferable aspect of the rupturable plate of the present invention, wherein a ratio ($h1/T$) of the depth ($h1$) of first fragile portion formed by the grooves to a thickness ($T$) of a portion in the rupturable plate devoid of the first fragile portions is within a range of 0.05 to 0.50;

a ratio ($h2/T$) of the depth ($h2$) of second fragile portion formed by the grooves to a thickness ($T$) of a portion in the rupturable plate devoid of the second fragile portions is within a range of 0.20 to 0.60; and the relationship of $h1<h2$ is satisfied.

The petal-like rupturing of the rupturable plate can be facilitated by adjusting the ratio of the thicknesses of the rupturable plate in the first fragile portions and the second fragile portions (the ratio of the depths of the respective fragile portions).

$h1/T$ is preferably 0.10 to 0.40, more preferably 0.10 to 0.30.

$h2/T$ is preferably 0.30 to 0.50, more preferably 0.35 to 0.50.

The inflator of the present invention is described hereinbelow in detail.

When the inflator uses a pressurized gas as a gas source, for example, the interior of a bottle-like housing (serves as a pressurized gas-filled space) is filled with a gas such as argon or helium under a high pressure, and the opening of the bottle serving as a gas outlet is closed with the rupturable plate.

In the inflator of the present invention, the rupturable plate, having the above-mentioned specific fragile portion (the combination of the first fragile portions and the second fragile portions), is used.

As a rupturing device for the rupturable plate, any device is usable provided that it applies a pressure enough to rupture the rupturable plate.

For example, an electric igniter, a combination of an electric igniter and a transfer charge, and a combination of an electric igniter and a gas generating agent can be used as the rupturing device. Furthermore, a piston operating in cooperation with the aforementioned device can be used in combination therewith.

When the inflator is activated, on receiving a pressure by activation of the rupturing device, the rupturable plate ruptures like petals and opens towards the pressurized gas-filled space (to the side of the surface provided with the second fragile portions and the first fragile portions), thereby opening a discharge path for the pressurized gas.

A preferable aspect of the inflator according to the present invention, including a bottle filled with a pressurized gas; and an ignition device unit mounted on an opening of the bottle, the ignition device unit having an ignition device and a piston that axially moves by activation of the ignition device, accommodated in an ignition device unit housing provided with a gas discharge port; and the rupturable plate having a closing between the bottle and the ignition device unit housing such that the one surface provided with the fragile portion of the rupturable plate faces the bottle and that the piston faces the rear surface opposite to the one surface provided with the fragile portion, the piston axially moving upon receiving a gas pressure generated by activation of the ignition device to collide with and rupture the rupturable plate.

The cylindrical bottle is filled with a gas such as argon or helium under a high pressure, and the gas outlet (the opening) is closed with the above-mentioned circular rupturable plate.

The circular rupturable plate is fixed by welding at the opening of the cylindrical bottle.

The fragile portion of the circular rupturable plate is formed in the surface facing the interior of the cylindrical bottle.

The combination of the ignition device and the piston ruptures the rupturable plate like petals and opens the rupturable plate and thereby opening the discharge path for the pressurized gas in the cylindrical bottle.

An electric igniter, a combination of an electric igniter and a transfer charge, a combination of an electric igniter and a gas generating agent, and the like can be used as the ignition device.

When an electric igniter alone or a combination of an electric igniter and a transfer charge is used as the ignition device, the gas source of the inflator is only the pressurized gas.

When a combination of an electric igniter and a gas generating agent is used as the ignition device, the gas source of the inflator is both the pressurized gas and the combustion gas of the gas generating agent.

The piston moves axially on receiving the pressure generated by the activation of the ignition device, collides with the rupturable plate and ruptures the rupturable plate like petals.

The piston is not particularly limited provided that it applies a pressure to the rupturable plate.

For example, a rod-like piston with a sharp tip can be used to apply a pressure to the center of the rupturable plate, so that the rupturable plate ruptures like petals. Alternatively, a rod-like piston with a flat or a spherical tip can be used to apply a pressure to the entire fragile portion of the rupturable plate, so that the rupturable plate ruptures like petals.

A preferable aspect of the inflator of the present invention including a pressurized gas chamber whose outer shell is formed by a cylindrical pressurized gas chamber housing and that is filled with pressurized gas;

a gas generator including an ignition device and a molded article of a gas generating agent accommodated in a gas generator housing which is connected to one end of the pressurized gas chamber;

a diffuser portion having a gas discharge port and connected to the other end of the pressurized gas chamber;

a first rupturable plate closing a first communication path between the pressurized gas chamber and the gas generator;

a second rupturable plate closing a second communication path between the pressurized gas chamber and the diffuser portion, at least one of the first rupturable plate and the second rupturable plate being the rupturable plate having the fragile portion according to claim 1 or 2, when the rupturable plate having the fragile portion is used as the first rupturable plate, the rupturable plate being attached such that the one surface provided with the fragile portion of the rupturable plate faces the pressurized gas chamber, and when the rupturable plate having the fragile portion is used as the second rupturable plate, the rupturable plate being attached such that the one surface provided with the fragile portion of the rupturable plate faces the diffuser portion.

The rupturable plate having the fragile portion described above is used as either one of the first rupturable plate and the second rupturable plate, or as both the first rupturable plate and the second rupturable plate.

When the rupturable plate having the fragile portion is used as the first rupturable plate, the rupturable plate is ruptured like petals by the pressure created by the activation of the ignition device, and a discharge path into the pressurized gas chamber housing is opened.

When the rupturable plate having the fragile portion is used as the second rupturable plate, the combustion gas of the gas generating agent flows into the bottle due to opening of the first rupturable plate and the internal pressure is increased in the bottle, and thereby, the second rupturable plate is ruptured like petals to open a gas discharge path into the diffuser portion (the gas discharge port).

Description of Embodiments

<Rupturable Plate 1>

A rupturable plate 1 will be explained herein with reference to (a) in FIG. 1.

The rupturable plate 1 is a disk with a thickness (T) of 0.30 mm.

The rupturable plate 1 is formed of a stainless steel, a nickel-alloy steel, or a low-carbon steel. When used in an inflator, the rupturable plate is fixed by welding to an inflator housing at a circumferential edge portion 2 thereof.

A hexagonal fragile portion 3 is formed on one surface of the rupturable plate 1.

The fragile portion 3 includes first fragile portions 5 formed by grooves (depth h1=0.06 mm) forming a circumference of the regular hexagon, and second fragile portions 4 formed by six grooves (depth h2=0.12 mm) formed from all apexes of the regular hexagon to the center of the regular hexagon. The second fragile portions 4 and the first fragile portions 5 are grooves with a trapezoidal cross section in the lateral direction.

In (a) in FIG. 1, six regular triangles 6 are formed, each triangle having the first fragile portion 5 as a base and the second fragile portions 4 as the remaining two sides.

The ratio (h1/T=0.06/0.30) of the depth (h1) of first fragile portion 5 to the thickness (t1=T) of the rupturable plate 1 in the first fragile portion 5 is 0.20.

The ratio (h2/T=0.12/0.30) of the depth (h2) of second fragile portion 4 to the thickness (t2=T) of the rupturable plate 1 in the second fragile portions 4 is 0.40.

As depicted in (b) in FIG. 1, when the rupturable plate 1 receives a pressure (a pressure from the direction indicated by an arrow which is generated by the activation of an ignition device on the surface devoid of the fragile portion 3, the rupturable plate 1 is bent at the first fragile portions 5 and fractured at the second fragile portions 4 so as to be opened in the petal-like configuration.

Figure 2:
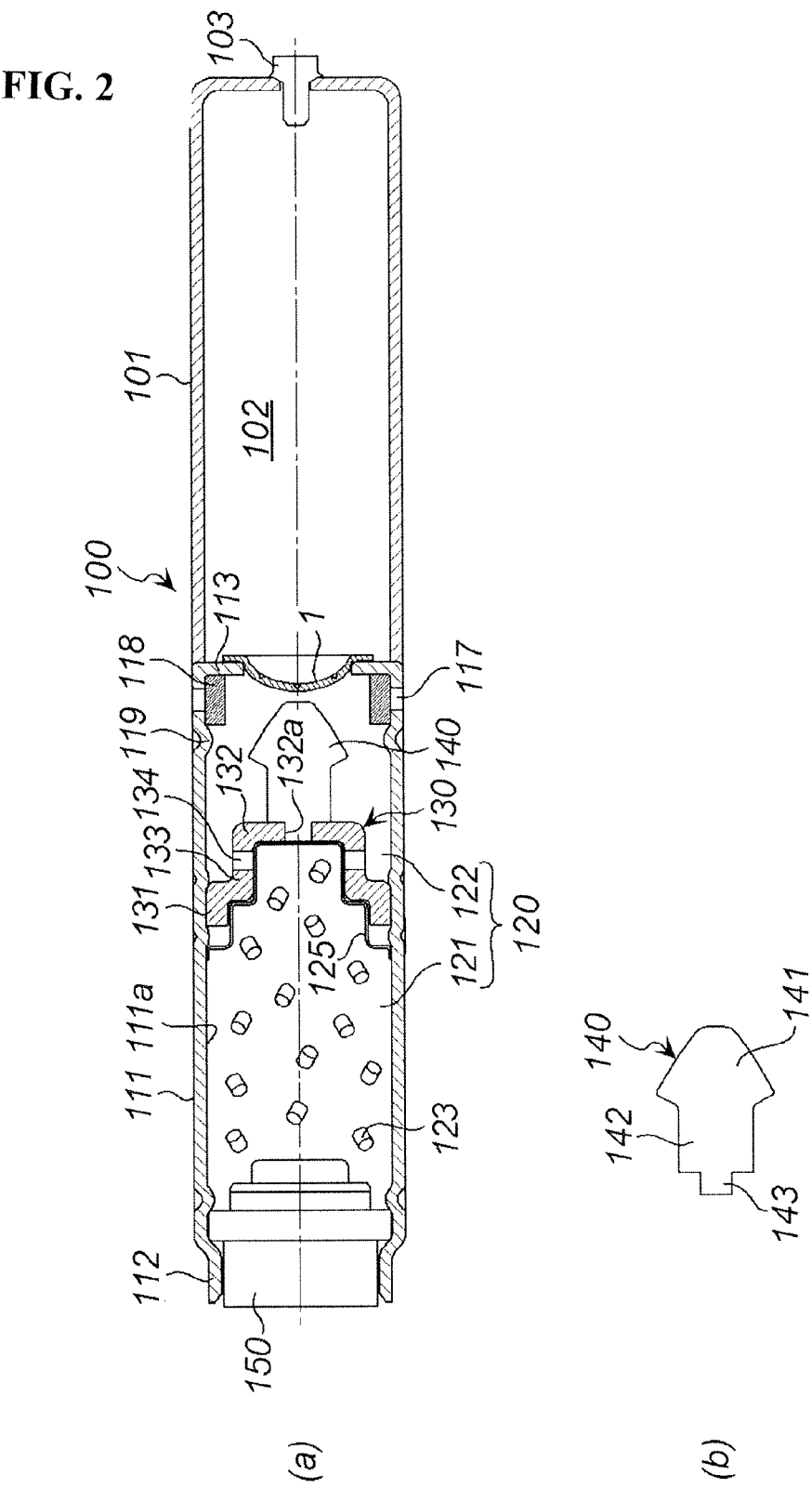
FIG. 2 shows, in (a), an axial sectional view of the inflator using the rupturable plate depicted in FIG. 1, and, in (b), a plan view of the piston used in (a) in FIG. 2.

<Inflator 100 Depicted in FIG. 2>

The inflator 100 depicted in FIG. 2 will be explained hereinbelow.

The inflator housing of the inflator 100 is formed of a bottle 101 and a cylindrical ignition device unit housing 111.

The interior of the bottle 101 is a pressurized gas chamber (a pressurized gas-filled space) 102 which is filled with a gas such as argon or helium under a high pressure. The reference numeral 103 denotes a pin for closing a hole through which the gas was filled.

The opening at one end (on the bottle 101 side) of the cylindrical ignition device unit housing 111 is fixed by welding to the opening of the bottle 101.

An electric igniter 150 is fitted into the opening at the other end 112 (opposite to the bottle 101 side) of the cylindrical ignition device unit housing 111 and fixed by deforming the other end 112 of the cylindrical ignition device unit housing 111 to reduce the outer diameter thereof.

An annular flat portion 113 extending inward in the radial direction is formed in the opening at one end (on the bottle 101 side) of the cylindrical ignition device unit housing 111, and the rupturable plate 1 is fixed by welding to the annular flat portion 113. The opening of the pressurized gas chamber (the pressurized gas-filled space) 102 is closed by the rupturable plate 1.

The cylindrical ignition device unit housing 111 is thus closed at both ends, and the interior thereof is an ignition device chamber 120.

The interior of the ignition device chamber 120 is separated by a convex partition wall 130 into a combustion chamber 121 and a diffuser chamber 122.

The shape of the convex partition wall 130 is not particularly limited, provided that it ensures separation into the combustion chamber 121 and the diffuser chamber 122.

The convex partition wall 130 depicted in FIG. 2 has an outer circumferential wall 131 which abuts against an inner circumferential surface 111a of the ignition device unit housing 111, an annular support portion 132 which has a fixing hole 132a for supporting and fixing a piston 140, and an inner circumferential wall 133 which is provided with a plurality of through holes 134 and joins the outer circumferential wall 131 and the annular support portion 132.

The convex partition wall 130 is fixed by press-fitting the outer circumferential wall 131 into the ignition device unit housing 111.

The interior of the combustion chamber 121 is filled with a predetermined amount of molded articles of a gas generating agent 123 in a state of contact with an igniter 150.

The through holes 134 of the convex partition wall 130 are closed from the inner side with a cup-shaped closing member 125, which is disposed inside the combustion chamber 121, to prevent moisture penetration.

The cup-shaped closing member 125 has the same shape as the inner shape of the convex partition wall 130 and is fitted into the convex partition wall 130 from the combustion chamber 121 side and pressed by the molded articles of a gas generating agent 123 to close the through holes 134.

Part of the closing member 125 is attached to the inner circumferential surface 111a of the ignition device unit housing 111, for example, by coating a known sealing agent, to ensure the air tightness of the combustion chamber 121.

The diffuser chamber 122 has a plurality of gas discharge ports 117 formed in the ignition device unit housing 111 close to the annular flat portion 113.

An annular filter 118 is fixed on the inner side of the plurality of gas discharge ports 117 in a state of being axially held between the annular flat portion 113 and a protrusion 119.

The diffuser chamber 122 is communicated with the external atmosphere through the gas discharge ports 117 and the annular filter 118.

The piston 140 is positioned inside the diffuser chamber 122.

The piston 140 has an arrowhead-like sharp tip 141, a shaft 142 and a protruding portion 143 and is fixed by inserting the protruding portion 143 into a fixing hole 132a of the convex partition wall 130.

The piston 140 is not limited to that depicted in FIG. 2, and can be the one having a columnar tip cut obliquely with respect to the axial direction, or can be a round column having no sharp tip.

The circumferential edge portion 2 of the rupturable plate 1 is fixed by welding to the annular flat portion 113 from the ignition device chamber 120 side such that the grooves forming the fragile portion 3 are on the pressurized gas chamber 102 side.

The rupturable plate 1 and the tip of the piston 140 are close to each other, but not in contact.

The operation performed when the inflator 100 depicted in FIG. 2 is used in an airbag apparatus is explained hereinbelow.

In the inflator 100 depicted in FIG. 2, the combination of the igniter 150, the molded articles of a gas generating agent 123 and the piston 140 functions as a device for fracturing the rupturable plate 1.

When the igniter 150 is activated, the molded articles of a gas generating agent 123 are ignited and burnt, and a combustion gas is generated inside the combustion chamber 121.

The pressure inside the combustion chamber 121 is thereby increased. As a result, the cup-shaped closing member 125 is ruptured, the through holes 134 are opened, and part of the combustion gas flows into the diffuser chamber 122.

The combustion gas which has flown into the diffuser chamber 122 is discharged from the gas discharge ports 117 after passing through the annular filter 118 and inflates an airbag.

Further, where the pressure inside the combustion chamber 121 is increased by the remaining combustion gas, the convex partition wall 130 moves toward the bottle 101.

Before the activation, the convex partition wall 130 is fixed by a shallow protrusion formed in the inner circumferential surface 111a of the ignition device unit housing 111, but the pressure moves the outer circumferential wall 131 over the protrusion.

The piston 140 also moves in the axial direction, and the tip 141 collides with the rupturable plate 1.

Since the depths of the grooves forming the fragile portions satisfy the relationship h1<h2, when the piston 140 collides, the six second fragile portions 4 of the rupturable plate 1 are easily ruptured, but the six first fragile portions 5 corresponding to the bases of the regular triangles 6 are bent rather than ruptured. Therefore, the rupturable plate 1 ruptures like petals and opens towards the pressurized gas chamber 102 (see (b) in FIG. 1). The first fragile portions 5 are formed in the surface in the rupturing direction to make the rupturable plate 1 rupture easily).

Therefore, the pressurized gas chamber 102 and the diffuser chamber 122 are communicated with each other, and the pressurized gas passes through the annular filter 118 together with the combustion gas, and then is discharged from the gas discharge ports 117 to inflate the airbag.

When the rupturable plate 1 is thus used as the rupturable plate of the inflator 100, the first fragile portions 5 are easily bent and the second fragile portions 4 are easily ruptured, the rupturable plate 1 is easily opened. Thereby, no fragments of the rupturable plate 1 are produced, and a load required to rupture the rupturable plate 1 is suppressed.

Therefore, an amount of the molded articles of a gas generating agent 123 loaded in the ignition device chamber 120 and the output of the igniter 150 can be reduced and the overall inflator 100 can be reduced in weight and size.

The annular filter 118 arrests the combustion residues contained in the combustion gas generated from the molded articles of a gas generating agent 123 and cools the combustion gas. The filter is not needed in an inflator which uses the rupturable plate of the present invention but does not use the molded articles of a gas generating agent, or in an inflator in which amounts of residues and heat generated from the molded articles of a gas generating agent are small.

Figure 3:
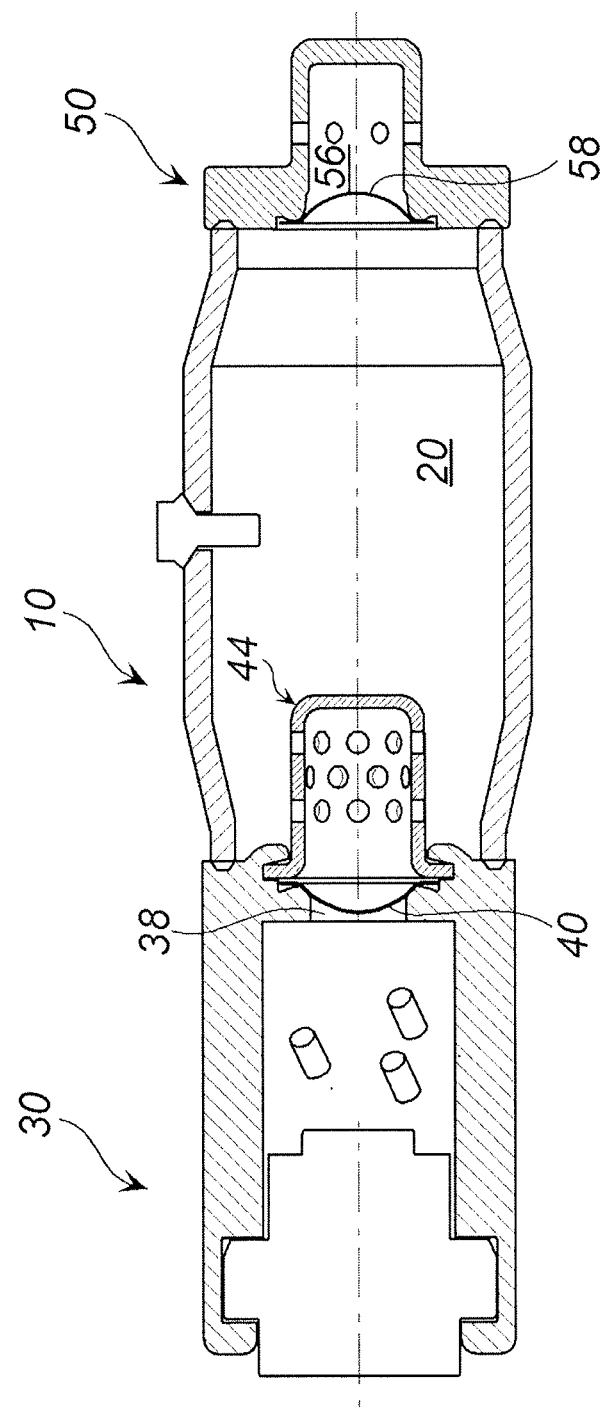
FIG. 3 shows an axial sectional view of the inflator of another embodiment using the rupturable plate depicted in FIG. 1.

<Inflator 10 Depicted in FIG. 3>

The inflator 10 depicted in FIG. 3 will be explained hereinbelow.

The inflator 10 depicted in FIG. 3 is identical to the inflator 10 depicted in FIG. 1 of JP-A No. 2008-137475, except for the rupturable plate.

In FIG. 3, the rupturable plate 1 is used as both a first rupturable plate 40 closing a first communication path 38 between a pressurized gas chamber 20 and a gas generator 30, and a second rupturable plate 58 closing a second communication path 56 between the pressurized gas chamber 20 and a diffuser portion 50, or as either one thereof.

When the rupturable plate 1 is used as the first rupturable plate 40, the fragile portion 3 is on the pressurized gas chamber 20 side.

When the rupturable plate 1 is used as the second rupturable plate 58, the fragile portion 3 is on the diffuser portion 50 side.

When the rupturable plate 1 is used as only one of the first rupturable plate 40 or the second rupturable plate 58, it is preferred that the rupturable plate 1 is used as the second rupturable plate 58.

When a rupturable plate having no fragile portion is used as the first rupturable plate 40, even though fragments are generated, they are arrested by the cap 44.

When the rupturable plate 1 is used as both the first rupturable plate 40 and the second rupturable plate 58 of the inflator 10 depicted in FIG. 3, the gas discharge path is easily opened and no fragments of the rupturable plate are generated.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:
1. A rupturable plate in a circular shape for closing an opening of a pressurized gas-filled space in an inflator, comprising:
    a fragile portion formed in the shape of a regular polygon on one surface of the rupturable plate, the fragile portion including,
        first fragile portions formed by grooves forming a circumference of the regular polygon, and second fragile portions formed by grooves extending from all apexes of the regular polygon to a center of the regular polygon;

a plurality of triangles formed by the first fragile portions as a base and the second fragile portions as the remaining two sides, a depth (h1) of said first fragile portions and a depth (h2) of said second fragile portions satisfying the relationship h1<h2, and wherein at the time of rupture, the rupturable plate receives a pressure on a rear surface opposite to the one surface provided with the fragile portion, and ruptures to a side of the one surface provided with the fragile portion.

2. The rupturable plate according to claim 1, wherein said rupturable plate has a thickness T, and a ratio (h1/T) of the depth (h1) of said first fragile portions formed by the grooves to the thickness (T) of the rupturable plate is within a range of 0.05 to 0.50;

a ratio (h2/T) of the depth (h2) of said second fragile portions formed by the grooves to the thickness (T) of the rupturable plate is within a range of 0.20 to 0.60; and the relationship of h1<h2 is satisfied.

3. An inflator charged with a pressurized gas as a gas source, comprising:

a gas outlet of the pressurized gas-filled space being closed with the rupturable plate according to claim 1, the rupturable plate being attached such that the one surface provided with the fragile portion faces a side of the pressurized gas-filled space; and a device for fracturing the rupturable plate.

4. An inflator, comprising:

a bottle filled with a pressurized gas; and an ignition device unit mounted on an opening of the bottle, the ignition device unit having an ignition device and a piston that moves axially by activation of the ignition device, accommodated in an ignition device unit housing provided with a gas discharge port; and the rupturable plate according to claim 1 closing between the bottle and the ignition device unit housing such that the one surface of the rupturable plate provided with the fragile portion faces the bottle and that the piston faces the surface of the rupturable plate opposite to the one surface provided with the fragile portion, the piston axially moving upon receiving a gas pressure generated by activation of the ignition device to collide with and rupture the rupturable plate.

5. A gas generator according to claim 4, further comprising a diffuser chamber including a plurality of gas discharge ports formed in the ignition device unit housing; a convex partition wall separating an interior of the ignition device unit housing into a combustion chamber and the diffuser chamber, the convex partition wall having an outer circumferential wall which abuts against an inner circumferential surface of the ignition device unit housing, an annular support portion which has a fixing hole for supporting the piston that is positioned inside the diffuser chamber, and an inner circumferential wall which is provided with a plurality of through holes and joins the outer circumferential wall and the annular support portion.

6. An inflator, comprising:

a pressurized gas chamber having an outer shell formed by a cylindrical pressurized gas chamber housing and that is filled with pressurized gas;

a gas generator including an ignition device and a molded article of a gas generating agent accommodated in a gas generator housing which is connected to one end of the pressurized gas chamber;

a diffuser portion having a gas discharge port connected to the other end of the pressurized gas chamber;

a first rupturable plate closing a first communication path between the pressurized gas chamber and the gas generator;

a second rupturable plate closing a second communication path between the pressurized gas chamber and the diffuser portion, at least one of the first rupturable plate and the second rupturable plate being the rupturable plate having a fragile portion according to claim 1, and wherein when the rupturable plate having the fragile portion is used as the first rupturable plate, the rupturable plate is attached with the one surface thereof provided with the fragile portion facing the pressurized gas chamber, and when the rupturable plate having the fragile portion is used as the second rupturable plate, the rupturable plate is attached with the one surface thereof provided with the fragile portion facing the diffuser portion.

7. A rupturable plate according to claim 1, wherein the grooves forming said first fragile portions and said second fragile portions are formed continuously.

8. A rupturable plate according to claim 1, wherein the grooves forming said first fragile portions and said second fragile portions are formed discontinuously.

9. A rupturable plate according to claim 1, wherein the grooves forming said first fragile portions are different in cross-sectional shape than the grooves forming said second fragile portions.

* * * * *